Sept. 9, 1941.  O. M. JENSEN  2,255,620
BACKING-UP BAR FOR HACK SAW BLADES
Filed Aug. 12, 1940
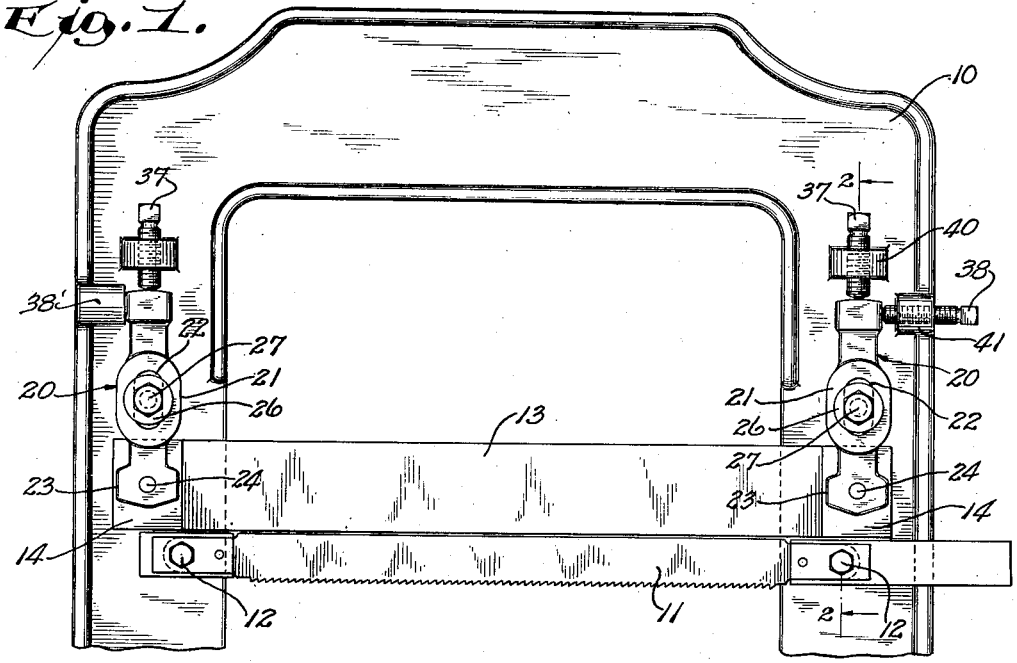
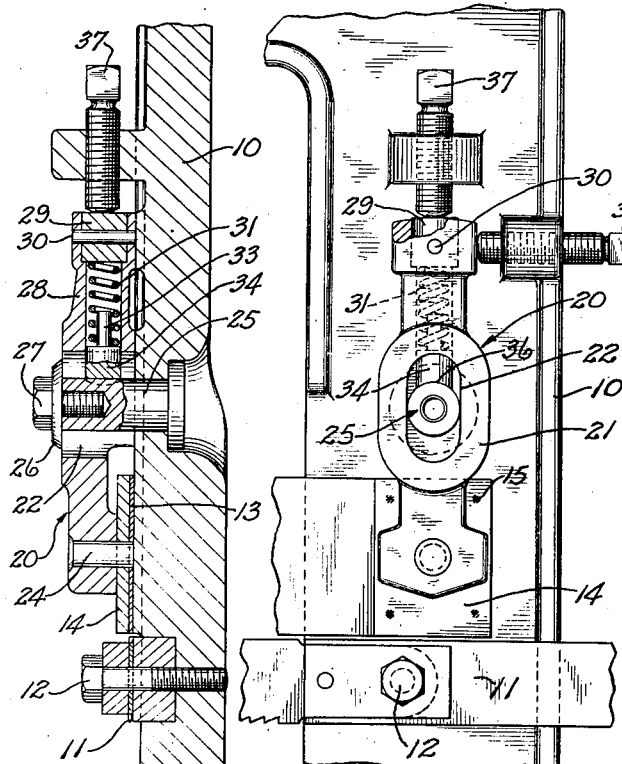
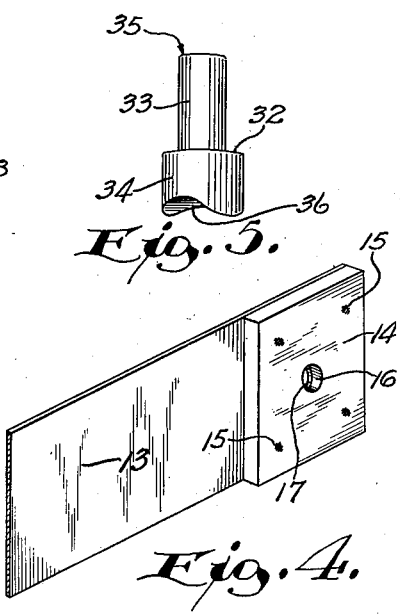
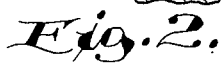
INVENTOR
OTTO M. JENSEN.
BY John W. Michael
ATTORNEY.

Patented Sept. 9, 1941

2,255,620

UNITED STATES PATENT OFFICE 2,255,620

BACKING-UP BAR FOR HACK SAW BLADES

Otto M. Jensen, Racine, Wis., assignor to Peerless Machine Company, Racine, Wis., a corporation of Wisconsin Application August 12, 1940, Serial No. 352,182

8 Claims. (Cl. 29—73)

This invention relates generally to metal saw machines or power-driven hack saws, and more particularly to the means provided in such machines for backing up the saw blade to improve its action and to preclude buckling, bending, or weaving thereof.

One of the objects of the invention is to provide a backing-up device for saw blades and hack saws which is simple in construction, reliable and effective in operation, readily adjusted to accommodate blades of different widths, and easy and comparatively inexpensive to manufacture and apply to the machine.

Other objects and advantages reside in certain novel features of the construction, arrangement, and combination of parts which will be hereinafter more fully described and particularly pointed out in the appended claims, reference being had to the accompanying drawing forming a part of this specification, and in which:

Figure 1 is a fragmentary view in elevation showing a portion of the reciprocating saw frame of a metal sawing machine having the saw blade attached thereto, and also being provided with a backing-up device embodying the present invention;

Figure 2 is a fragmentary view in vertical cross section taken on line 2—2 of Figure 1;

Figure 3 is a fragmentary view on an enlarged scale partly in elevation and partly in transverse vertical cross section, to better illustrate one of the holding and tensioning clamps of the backing-up device and the parts associated therewith;

Figure 4 is a fragmentary view in perspective of one end of the backing-up plate to illustrate the manner in which a reinforcing block is combined with each end thereof; and Figure 5 is a perspective view of the take-up plunger combined with each holding and tensioning clamp to automatically retract the clamp as its hold-down screw is backed off.

Referring to the drawing, the numeral 10 designates the horizontally reciprocable frame of the metal sawing machine of the type disclosed and claimed in Patent No. 1,598,011, granted August 31, 1926, to Charles Rasmussen, and assigned to the Peerless Machine Company, of Racine, Wisconsin, assignee of the present invention. As illustrated in Figure 1, the sawing machine, just as in the patent referred to, includes a saw blade 11 suitably fastened, as at 12, to the vertical members of the saw frame 10. A backing plate or bar 13 is provided. For the major portion of its length, that is, for a distance equal to the full active or toothed portion of the saw blade, the backing plate 13 is .010 less in thickness than the saw blade to preclude its wedging in the cut, and it has its lower edge set $\frac{1}{32}$" above the upper edge of the saw blade to provide for limited flexion of the saw blade when it is under heavy pressure and yet prevent excessive bowing of the blade, thereby aiding and keeping it straight. The result is better and faster cutting and also a positive and definite lift of the saw blade on the return stroke is assured, consequently increasing the life of the saw blade.

The present invention proposes to reinforce, stiffen, and strengthen the ends of the backing plate 13 by means of rectangular reinforcing blocks 14 of heavy gauge metal, which are spot welded, as at 15, to the backing plate. Each reinforcing plate 14 is provided with a centrally disposed opening 16, which is in alinement with a corresponding opening 17 formed in the adjacent end of the backing plate. Hold-down and tensioning clamps, designated generally at 20, are provided, one for each end of the backing plate. As these clamps 20 are of identical construction, a single description will apply to both.

Each clamp 20 comprises a heavy metal body portion 21 formed with a longitudinal slot 22 which is symmetrically disposed with respect to the longitudinal and transverse axis of the body portion. The lower end of each clamp is laterally enlarged, as at 23, and is provided with a pin 24, the pin 24 being fixed to the end 23 of the clamp and projecting inwardly therefrom so as to be snugly fitted in the openings 16 and 17 in the assembly. A guide stud 25 is fixed to each vertical end member of the saw frame adjacent each clamp and extends through the slot 22 of the adjacent clamp to constrain the clamp to longitudinal sliding and pivotal movement about the stud 25. Each clamp is held on its guide stud by means of a washer 26 and stud bolt 27.

The upper portion of each clamp is provided with an axial socket 28, the lower end of which opens into the slot 22. The upper end of the socket is closed by a hardened steel plug 29 fastened to the clamp by a pin or rivet 30. A rather heavy or stiff coil spring 31 is disposed in the socket 28 with its upper end abutting the plug 29. The lower end of each spring 31 abuts the shoulder 32 formed at the juncture of the stem 33 and head 34 of a take-up plunger, designated generally at 35. The head 34 of the plunger 35 is formed with a rounded concave recess 36 so as to snugly fit against the upper portion of the guide stud 25.

Combined with each clamp 20 is a hold-down screw 37. Each hold-down screw 37 is vertically disposed and is in threaded engagement with an internally threaded lug 40 which may be formed integral with the saw frame and which overlies the upper end of the clamp. The lower end of each hold-down screw 37 is rounded and bears against the hardened, smooth surface of the plug 29 of the underlying clamp.

A tensioning screw 38, threadedly engaged with the internally threaded opening of a bearing lug 41, is provided at one end of the saw frame. The bearing lug 41 is integral with the saw frame and is disposed along the side of the upper end of its adjacent clamp. The inner end of the tensioning screw 38 is also rounded and engages the smooth outer side face of the upper end of the adjacent clamp. At the opposite end of the frame the outer side face of the upper end of the clamp 20 engages an abutment lug 38' integral with the saw frame.

By tightening down on the screws 37, the clamps 20 are slid downwardly against the tension of their springs 31 and force the lower edge of the backing plate 13 into firm position 1/32" above the upper edge of the saw 11. By tightening up on the screw 38, the clamps 20 are rocked about their respective guide studs to tauten or tension the backing plate 13, thereby preventing buckling or weaving thereof.

The reinforcing blocks 14 not only stiffen and strengthen the ends of the backing plate, but provide for a much more effective transmission of the hold-down and tensioning pressures from the clamps to the backing plate. If it is desired to replace the saw blade with one of a different size, for example one of a greater width, screws 37 and 38 are backed off. Thereupon the springs 31 automatically pull the clamps 20, and consequently the back plate 13, upwardly, thereby facilitating replacement of the blade 11 with one of larger size. Then, by tightening up screws 37 and 38, the machine is again put in condition for service.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. In a metal sawing machine, in combination with a reciprocating saw frame and a saw blade, a backing plate engageable with the saw blade and having stiffening and reinforcing blocks welded to its ends, and means cooperating with said reinforced and stiffened ends to set the backing plate just above the saw blade and place the backing plate under tension.

2. In a metal sawing machine, in combination with a reciprocating saw frame and a saw blade, a backing plate having its lower edge just above the top edge of the saw blade, stiffening and reinforcing blocks welded to the ends of the backing plate, said blocks and said backing plate having alined, transversely extending openings, and tension and hold-down clamps interengaged with the openings of blocks and plate for adjusting the backing plate toward the saw blade and placing it under longitudinal tension.

3. In a metal sawing machine, in combination with a saw frame and a saw blade, a backing plate engaged with the saw blade, means for adjusting the backing plate toward the saw blade and for placing it under longitudinal tension, and means for automatically moving the backing plate away from the saw blade when said last mentioned means is released.

4. In combination with a metal sawing machine having a saw frame and a saw blade, a backing plate engageable with the saw blade, holding and tensioning clamps supported on the saw frame for sliding and pivotal movement and interengaged with the ends of the backing plate, screws coacting with the clamps for causing them to set the backing plate into position above the saw blade and place it under tension, and means carried by the clamps for automatically moving the backing plate away from the saw blade when said screws are backed off.

5. In a metal sawing machine, in combination with a reciprocating saw frame and a saw blade carried thereby, a backing plate having its lower edge engageable with the upper edge of the saw blade, hold-down and tensioning clamps having their lower ends interengaged with the ends of the backing plate, studs supporting the clamps on the saw frame for rocking and sliding movement, springs interposed between the clamps and the studs for urging the clamps to move the backing plate away from the saw blade, and screws mounted on the saw frame and coacting with the clamps to slide them and the backing plate toward the saw blade and to place the backing plate under tension.

6. In a metal sawing machine, in combination with a reciprocating saw frame, and a saw blade carried thereby, a backing plate engageable with the saw blade, hold-down and tensioning clamps having their lower ends pivotally interconnected with the ends of the backing plate, the intermediate portions of said clamps having longitudinal slots, studs carried by the saw frame and fitted in said slots so as to support the clamps for sliding and rocking movement, the upper portion of said clamps having sockets opening into said slots, springs disposed in said sockets, plungers engaged with the springs and with the studs, and hold-down and tensioning screws coacting with the upper end portions of the clamps.

7. In a metal sawing machine, in combination with a reciprocating saw frame and a saw blade carried thereby, a backing plate engageable with the saw blade and having stiffening and reinforcing blocks welded to its ends, said blocks and end portions of the plate to which they are welded having alined openings, hold-down and tensioning clamps supported on the saw frame for sliding and pivotal movement and having pins fixed to their lower ends and projecting inwardly therefrom and interfitted with the alined openings in the end portions and reinforcing blocks of the backing plate, and hold-down and tensioning screws coacting with the clamps to cause them to press the backing plate against the saw frame and place it under longitudinal tension.

8. In a metal sawing machine, in combination with a reciprocating saw frame and saw blade carried thereby, a backing plate engageable with the saw blade, hold-down and tensioning clamps supported on the saw frame for sliding and pivotal movement and having their lower ends pivotally interconnected with the ends of the backing plate, hold-down screws mounted on the saw frame and engageable with the upper ends of the clamps to cause them to set the backing plate into position above the saw blade, an abutment at one end of the saw frame engageable with the outer face of the upper end of the adjacent clamp, and a tensioning screw at the other end of the saw frame engageable with the outer face of the upper end of the adjacent clamp and operable when tightened up to place the backing plate under longitudinal tension.

OTTO M. JENSEN.